UNITED STATES PATENT OFFICE.

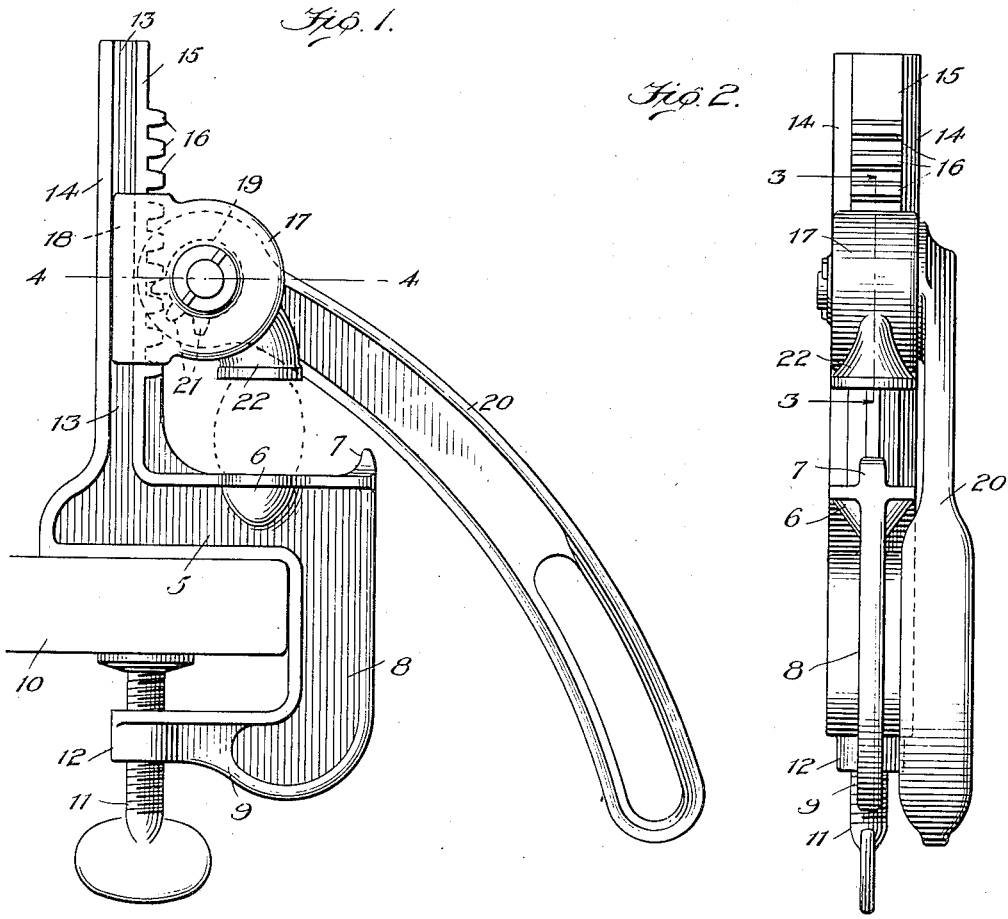

FRANK B. DEMING, OF SALEM, OHIO, ASSIGNOR TO W. H. MEYERHOFER, OF SALEM, OHIO.

NUTCRACKER.

1,246,397.  Specification of Letters Patent.  Patented Nov. 13, 1917.

Application filed April 21, 1916. Serial No. 92,667.

*To all whom it may concern:*

Be it known that I, FRANK B. DEMING, a citizen of the United States, residing at Salem, in the county of Columbiana and State of Ohio, have invented certain new and useful Improvements in Nutcrackers; and I do hereby declare the following to be a full, clear, and exact description of the invention, such as will enable others skilled in the art to which it appertains to make and use the same.

My invention, generally stated, relates to kitchen and table articles, but more particularly to implements or tools for cracking nuts, and to a lever-actuated tool of the character indicated, by agency whereof nut shells may be cracked with great facility, between a fixed anvil and a relatively movable head, without risk of injury to the hands of an operator.

The present invention, therefore, has for an object, the production of nut cracking tools which are at once light, durable, and inexpensive, also powerful and easily manipulated, and unlikely to become broken or deranged because of their simplicity of construction and carefully balanced distribution of strains.

A further object of the invention is the production of means whereby nuts may be speedily cracked, and the crushing pressure accurately controlled so as to prevent undue crushing of shells, and to permit the removal of their contents practically unbroken.

With the foregoing and other objects in view the present invention will be hereinafter particularly described, and then set forth in the following claim.

In the accompanying drawings which form part of this application for Letters Patent and whereon like numerals refer to corresponding parts in the several views:

Figure 1 is a side elevation of the complete invention in position for use upon a table top, and in the process of cracking a nut indicated by dotted lines.

Fig. 2 is a front elevation of parts illustrated by Fig. 1.

Fig. 3 is a fragmentary view in vertical central section taken on the line 3—3 of Fig. 2, and Fig. 4 is also a fragmentary view, but in horizontal section taken transversaly through the implement on the line 4—4 of Fig. 1.

Reference being had to the drawings and numerals thereon, 5 indicates the fixed jaw or anvil element of the invention, preferably of malleable iron, and having a centrally disposed nut-receiving pocket or depression 6, formed in its upper surface, as also an upstanding spur 7 at its outer end for purposes which will later appear. Depending from said anvil 5, as an integral part thereof, is a vertical bracket 8, terminating in an angular inwardly extending foot 9, which latter is therefore adapted to be projected beneath a table top such as 10, there to be secured by a fastening screw 11, operating in the well understood manner through screw-threaded boss 12 at the end of the foot 9 aforesaid, as best shown by Fig. 1 of the drawings.

Rising vertically from the innermost end of anvil 5, and also of integral formation therewith, is a ratchet bar 13 of substantially T-shape in cross section as shown by Fig. 4, having a flanged back 14, and parallel with this a front flange of lesser width 15, upon the outer face of which latter is formed a series of ratchet teeth 16. Mounted upon the ratchet bar and guideway 13 is a movable head 17 of substantially circular form and hollow, having angular converging flanges 18, 18 at its rear edge for engaging opposite sides of the said bar 13 between flanges 14 and 15 serving as a runway or guideway for said head.

Within the head 17 is centrally journaled a mutilated or half pinion gear 19, by preference cast integral with an operating lever 20 extending from one side, the uppermost of teeth 21 of said gear 19 being arranged and adapted to mesh first in order with teeth 16 of the ratchet bar 13 when lever 20 assumes a position slightly below horizontal.

From the under side of the movable head 17, as best shown by Figs. 1 and 3, is a downwardly projecting boss 22, having a nut-receiving depression or recess 23 in vertical alinement with the corresponding nut-receiving pocket 6 hereinbefore mentioned.

The operation of the tool above described is quite obvious, it may be noted, however, that it is particularly well adapted for cracking pecans, hickory nuts and shellbarks.

Lever 20 having been elevated to substantially a horizontal position, teeth 21 upon mutilated pinion 19 are thereby disengaged from teeth 16 of the rack bar 13, leaving the head 17 free to move in either direction in the guideway of rack bar 13. After thus elevating head 17 a sufficient distance a nut may be placed in depression 6, the head 17 being lowered until its depression 23 engages the upper end, or opposite side, of the nut as indicated by Fig. 1.

Depression of the operating lever 20 next causes the teeth 21 to successively mesh with corresponding teeth 16 of the rack bar 13, thereby forcing the movable head 17 into crushing engagement with the nut under operation, and it will be noted that the degree of pressure required may thus be regulated to a nicety.

At the outer end of the fixed jaw or anvil element 5 of the present structure, there is positioned the upstanding spur 7 aforesaid, having an important function to perform. As a means of catching and collecting cracked nuts after the breaking operation above described, there is usually provided a bucket or similar receptacle. The present invention contemplates hanging a bucket or pail for the purpose stated, by its bail, transversely across the outer end of anvil 5, in which position the said spur 7 serves to retain same in position and prevent dislodgment thereof in an outward direction; while at the same time it will be noted that the edge of table 10 prevents accidental movement of the said bail in the opposite direction, which inward movement, if permitted, would occasionally result in interference with the descending boss 22 of the movable head 17.

Having thus described my invention, what I now claim and desire to secure by Letters Patent is:

In a nut cracker the combination with a suitably supported horizontally disposed anvil, a vertically disposed relatively fixed rack-bar surmounting the anvil, of a nut cracking head movable vertically upon the rack-bar, an operating lever capable of bodily elevating and depressing said head when in substantially a horizontal position, a mutilated pinion carried by said lever and rotatably mounted upon said head having teeth arranged and adapted to be wholly disengaged from said rack-bar when the operating lever is elevated to and above a horizontal position and adapted to forcibly engage the teeth of said rack-bar when said lever descends below a horizontal position.

In testimony whereof I affix my signature, in presence of two subscribing witnesses.

FRANK B. DEMING.

Witnesses:
S. W. RAMSEY,
Mrs. BESSIE CARY.